United States Patent [19]

Nakane

[11] Patent Number: 5,186,077
[45] Date of Patent: Feb. 16, 1993

[54] TORQUE VARIATION ABSORBING DEVICE

[75] Inventor: Mototaka Nakane, Toyota, Japan

[73] Assignee: Aisin Seiki Kabushiki Kaisha, Kariya, Japan

[21] Appl. No.: 855,877

[22] Filed: Mar. 23, 1992

[30] Foreign Application Priority Data

Mar. 30, 1991 [JP] Japan .................................. 3-67324

[51] Int. Cl.$^5$ .......................... G05G 1/00; F16F 15/10
[52] U.S. Cl. ........................................ 74/574; 74/572; 464/83; 464/90; 192/70.17
[58] Field of Search ...................... 74/572, 573 R, 574; 464/89, 90, 91; 192/70.17, 106 R

[56] References Cited

U.S. PATENT DOCUMENTS

| | | | |
|---|---|---|---|
| 4,680,984 | 7/1987 | Wahling et al. | 464/89 X |
| 4,693,354 | 9/1987 | Umeyama et al. | 192/70.17 X |
| 4,727,970 | 3/1988 | Reik et al. | 192/70.17 |
| 4,734,079 | 3/1988 | Viets | 74/574 X |
| 4,790,791 | 12/1988 | Sumida et al. | 464/89 X |
| 4,890,709 | 1/1990 | Reik et al. | 192/70.17 |
| 4,890,710 | 1/1990 | Reik et al. | 74/574 |
| 4,899,617 | 2/1990 | Kobayashi et al. | 74/574 |
| 4,989,710 | 2/1991 | Reik et al. | 74/574 X |
| 5,005,686 | 4/1991 | Reik et al. | 192/70.17 |
| 5,012,694 | 5/1991 | McGrath | 74/572 |
| 5,069,321 | 12/1991 | Reik et al. | 192/70.17 |

FOREIGN PATENT DOCUMENTS 8901097 2/1989 PCT Int'l Appl. ................. 074/574

Primary Examiner—Vinh T. Luong
Attorney, Agent, or Firm—Burns, Doane, Swecker & Mathis

[57] ABSTRACT

A torque variation absorbing device is comprised of an engine inertia body divided into a drive plate and a flywheel which is connected to the drive plate so as to be rotatable relative thereto, a space defined between the drive plate and the flywheel, an elastic member fixedly mounted on the flywheel and having at its outer periphery a plurality of projections, a plurality of plates arranged in such a manner that one end of the plate is secured on the projection and the other end of the plate is overlapped with one end of the adjacent plate which is secured on the adjacent projection, a ball interposed between each of the plates and an inner periphery of the drive plate, and a round shaft interposed between the other end of the plate and one end of the adjacent plate.

4 Claims, 4 Drawing Sheets

TORQUE VARIATION ABSORBING DEVICE

BACKGROUND OF THE INVENTION

1. Field of the Invention

The present invention relates to a torque variation absorbing device, and in particular to a torque variation absorbing device which is to be used for automotive vehicles, industrial vehicles or vessels.

2. Description of the Related Art

As shown in FIGS. 3 and 4, in a related torque variation absorbing device to be used in an automotive vehicle, an engine inertia member is divided into a drive inertia member 1 and a driven inertia member 2, which is rotatably connected or coupled to the drive inertia member 1 via a bearing 3. An inner surface of the drive inertia member 1 which is in opposition to the outer periphery of the driven inertia member 2 is so notched as to define an inner space 7 between the notch and the driven inertia member 2. An elastic member 4 which is in the form of a multi-sided configuration is mounted at its inner periphery on the outer periphery of the driven inertia member 2 and a metal plate 5 is secured on each side of the elastic member 4. A ball 6 is rotatably held between the metal plate 5 and the inner periphery of the drive inertia member 1 which is in a form of the circular configuration.

In the foregoing torque absorbing device, upon rotation of the drive inertia member 1 relative to the driven inertia member 2, each ball 6 is moved along the metal plate 5 as a result of the rotation of the drive inertia member 1, which causes a partial load to be applied to the elastic member 4, resulting in the establishment of the torque transmission. Due to the resultant torque transmission, the rotational energy developed or generated between the drive inertia member 1 and the driven inertia member 2 is stored or emitted, resulting in the torque variation being absorbed. That leads to a decrease in the vibration of the vehicle which is caused by the foregoing torque variation.

However, in the foregoing torque variation absorbing device, the torque transmission is set to be established in such a manner that the distribution of the load application to the elastic member from the ball 6 urges the plate 5 inwardly in the radial direction. Thus one side of the elastic member 4 is applied with an increasing force the other side of the elastic member 4 is applied with the decreasing force. Thus, when the large centrifugal force is applied to the elastic member 4 and the metal plate 5, a portion of the elastic member 4 on which the decreasing force is applied from the plate 5 is liable to float outwardly in the radial direction, resulting in the interference of the plate 5 with the inner periphery of the driving inertia member 1. As a result the foregoing torque variation absorbing device cannot bear or stand a high speed rotation.

SUMMARY OF THE INVENTION

An object of the invention is to provide a torque variation absorbing device without the above-mentioned drawback.

Another object of the invention is to provide a torque variation absorbing device which can endure or stand a high speed rotation.

In order to attain the foregoing objects, a torque variation absorbing device is comprised of an engine inertia body divided into a drive plate and a flywheel which is so connected to the drive plate as to be rotatable relative thereto, a space defined between the drive plate and the flywheel, an elastic member fixedly mounted on the flywheel and having at its outer periphery a plurality of projections, a plurality of plates arranged in such a manner that one end of the plate is secured on the projection and the other end of the plate is overlapped with one end of the adjacent plate which is secured on the adjacent projection, a ball interposed between each of the plates and an inner periphery of the drive plate, and a round shaft interposed between the other end of the plate and one end of the adjacent plate.

BRIEF DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which.

DESCRIPTION OF THE PREFERRED EMBODIMENT

Figure 1:
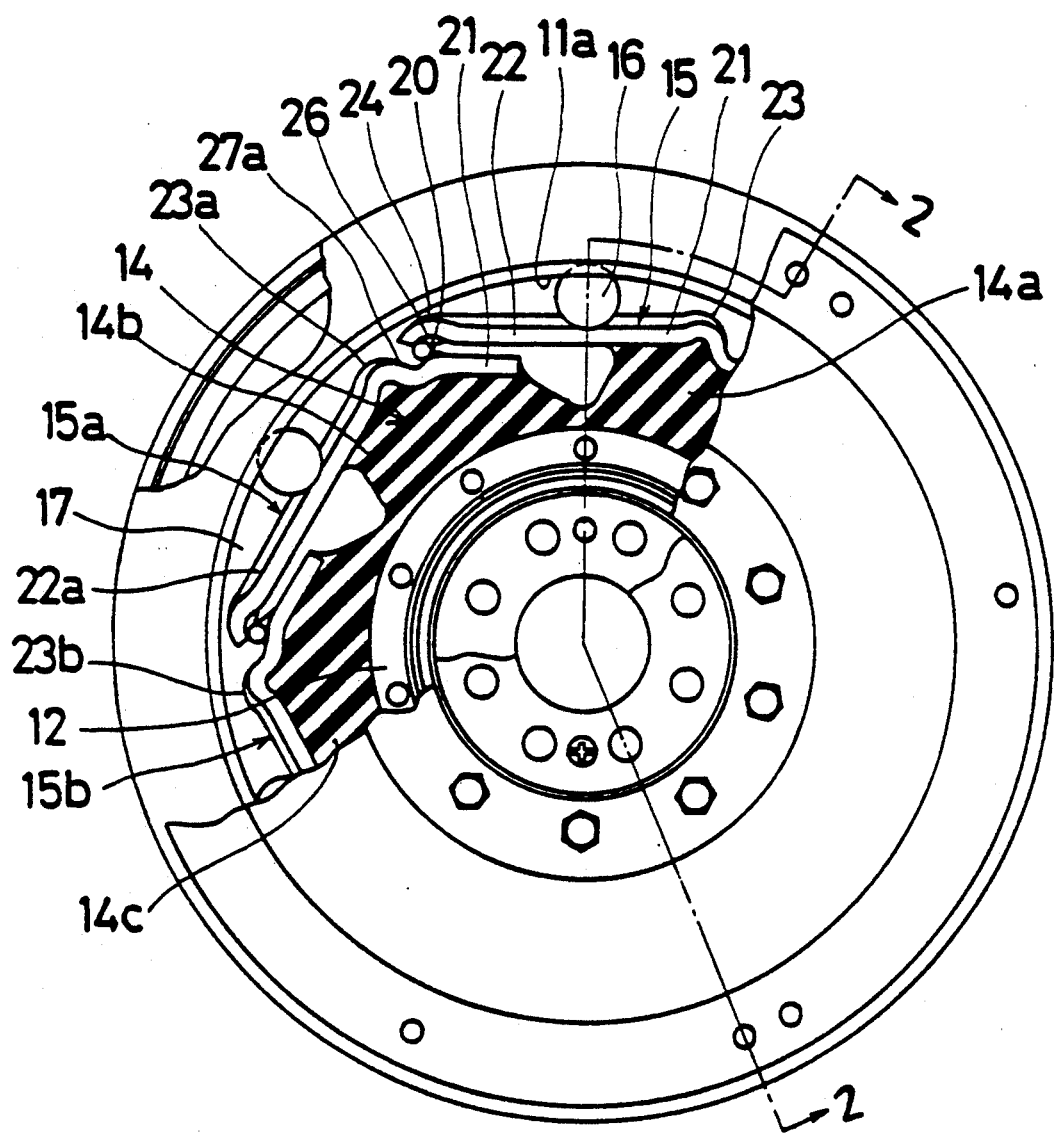
FIG. 1 is a front view partially in cross-section of a torque variation absorbing device according to the present invention.
Figure 2:
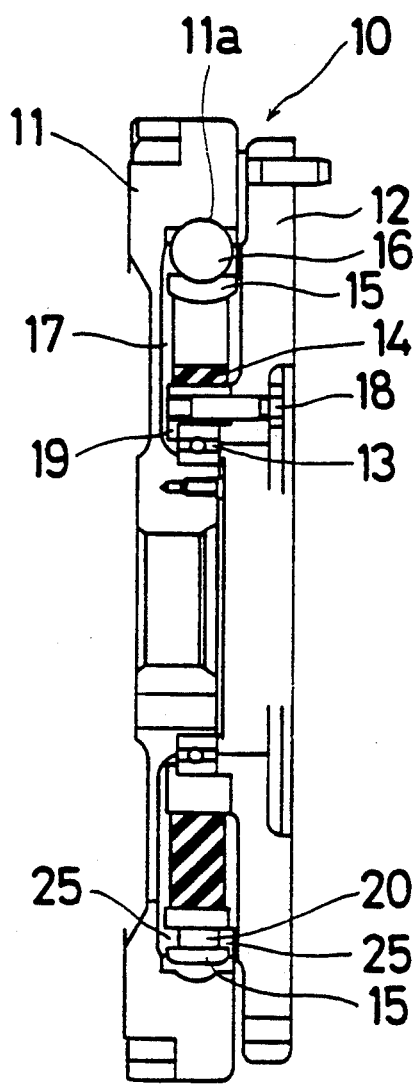
FIG. 2 is a cross-sectional view of a torque variation absorbing device taken along line 2—2 in FIG. 1.
Figure 3:
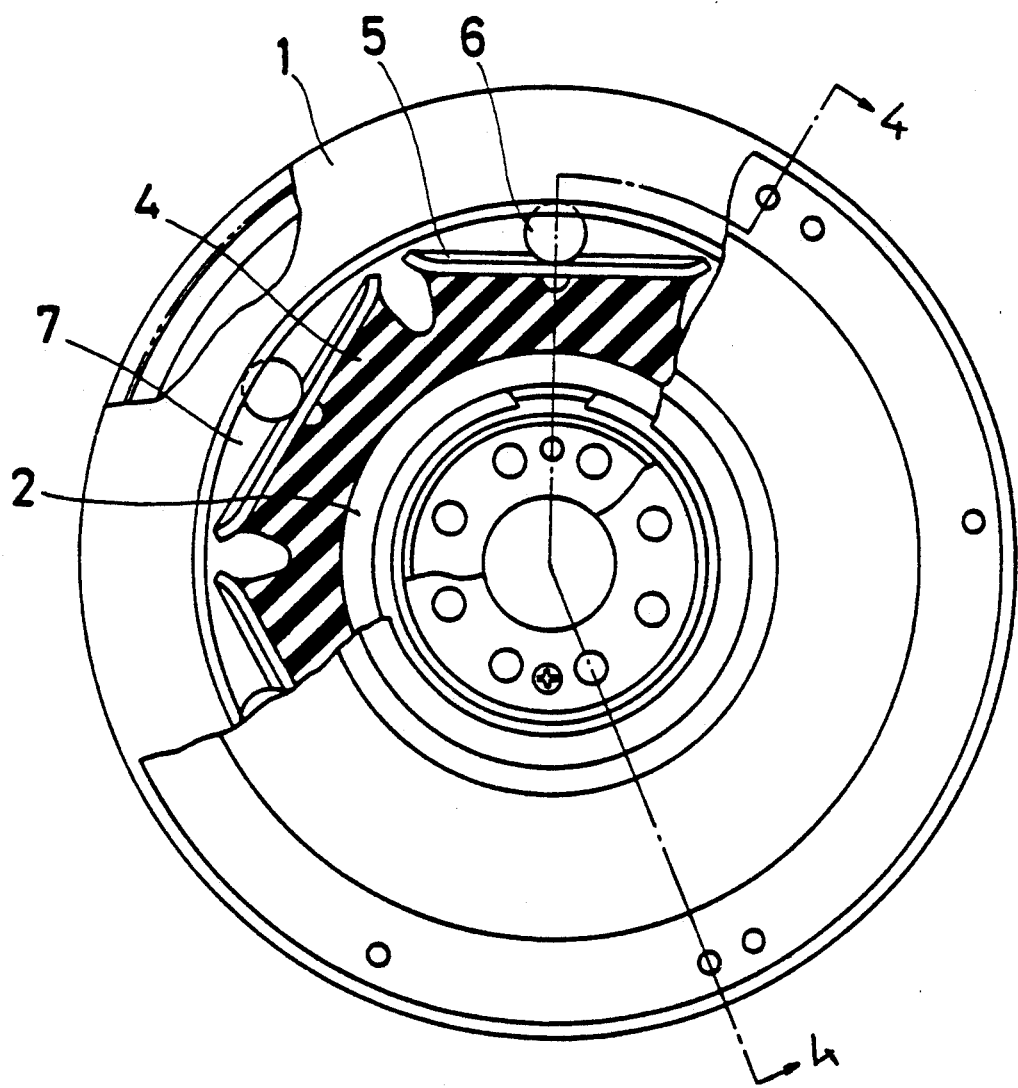
FIG. 3 is a front view partially in cross-section of a torque variation absorbing device according to the related art.
Figure 4:
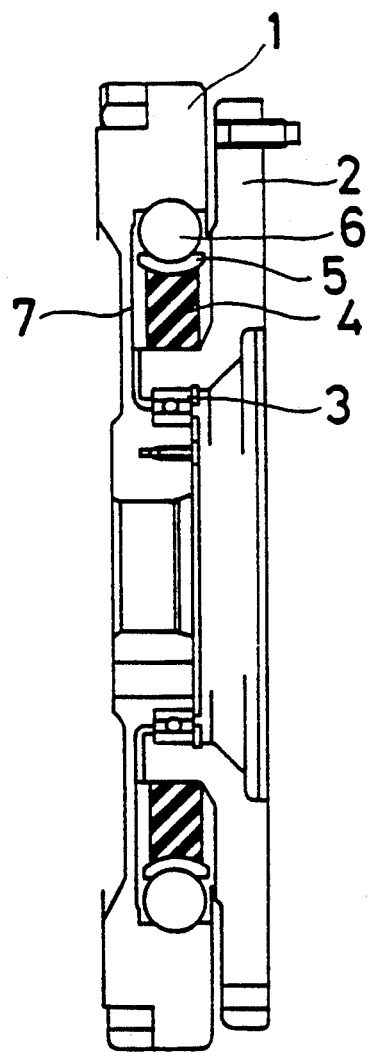
FIG. 4 is a cross-sectional view of a torque variation absorbing device taken along line 4—4 in FIG. 3.

Referring to FIGS. 1 and 2, an inertia member 10 of an engine (not shown) is divided into a drive plate 11 at the engine side and a flywheel 12 at a clutch disk side, and the flywheel 12 is co-axially connected to the drive plate 11 via a ball bearing 13 so as to be rotatable relative thereto. An inner periphery of the drive plate 11 which is in opposition to an outer periphery of the flywheel 12 is formed into a notched configuration, thereby being defining a space 17 therebetween. In the space 17, there is accommodated a flange 19 which is secured to the flywheel 12 by a bolt 18. On the flange 19, there is mounted an elastic member 14 which is provide at its outer periphery with a plurality of equally pitched projections 14a, 14b, 14c . . . .

A right end 21 of a metal plate 15 is secured to the projection 14a and a left end 22 of the metal plate 15 is overlapped with a right end 22a of another or an adjacent plate 15a via a round metal shaft 20 which is able to roll therebetween. An annular groove 11a is formed along the inner periphery of the drive plate 11, in which a plurality of balls 16 are arranged so that each of balls 16 is able to roll.

Each plate 15 is bent into a shallow inverted V-shaped configuration in such a manner that the right ends of two adjacent plates 15 and 15a are parallel with each other.

A pair of stepped portions 23 and 24 which are spaced apart from one another in a lengthwise manner are formed on the plate 15 and serve to regulate the travel distance of the ball 16 and allow the ball 16 to slip. The relative position between the stepped portions 23 and 24 is set to be defined in such a manner that the counter-clockwise rotation becomes less than the clockwise rotation starting from the illustrated neutral position of the ball 16 which is defined by the plate 15 and the drive plate 11 under the no torque transmitted condition.

Axial movement of the shaft 20 is restricted by a pair of axially spaced guides 25 and 25, and a maximum circumferential movement of the shaft 20 is within a length defined by a concave portion 26 formed at an inner surface of the stepped portion 24 and a concave portion 27a near a stepped portion 23a formed at the end portion 21a of the plate 15a.

Similar structural features are associated with the other projections 14b, 14c . . . .

In operation, when the drive plate 11 is rotated in the clockwise direction relative to the flywheel 12 due to the positive torque transmission from the engine, each ball 16 which is moved rolls toward the left end 22 of the plate 15 and urges the left end 22 of the plate 15 inwardly in the radial direction due to the fact that the ball 16 is being pressed between the inner groove 11a of the drive plate 11 and the plate 15. However, the left end 22 of the plate 15 is set to urge the right end of the adjacent plate 15a, resulting in the prevention of the floating of corresponding portions of the elastic member 14. Thus, the interference between the plate 15 and the drive plate 11 can be prevented.

If the torque exceeds a set value, the ball 16 is restricted in its travel by the stepped portion 24 on the left end 22 of the plate 15 and is brought into the slipping condition between the stepped portion 24 and the drive plate 11: Thus, the torque transmission is interrupted between the drive plate 11 and the flywheel 12, thereby preventing the breakage or the malfunction of the torque variation absorbing device.

On the other hand, if the torque in the negative direction is transmitted from the decelerating wheel, the drive plate 11 is brought into the counter-clockwise rotation relative to the flywheel 12. In this case, the maximum torque transmission at the negative side is decreased, resulting in a decrease in the maximum acceleration which will lead to the decreasing of the vibration upon sympathy. The reason is that the relative position between the stepped portions 23 and 24 is set to be defined in such a manner that the counter-clockwise rotation becomes less than the clockwise rotation relative to the neutral position of the ball 16 which is defined by the plate 15 and the drive plate 11 under the no torque transmitted condition.

Obviously, numerous modifications and variations of the present invention are possible in light of the above teachings. It is therefore to be understood that within the scope of the appended claims, the invention may be practiced otherwise than as specifically described herein.

What is claimed is:

1. A torque variation absorbing device comprising:
    an engine inertia body divided into a drive plate and a flywheel which is so connected to the drive plate as to be rotatable relative thereto;
    a space defined between the drive plate and the flywheel;
    an elastic member fixedly mounted on the flywheel and having its outer periphery a plurality of projections;
    a plurality of plates arranged in such a manner that one end of the plate is secured on the projection and the other end of the plate is overlapped with one end of the adjacent plate which is secured on the adjacent projection;
    a ball interposed between each of the plates and an inner periphery of the drive plate; and
    a round shaft interposed between the other end of the plate and one end of the adjacent plate.

2. A torque variation absorbing device according to claim 1, wherein each of the plates is bent into a shallow V-shaped configuration so that the other end of the plate is in paralelly relationship to one end of the adjacent plate.

3. A torque variation absorbing device according to claim 1, wherein each of the plates is provided with a pair of spaced stepped portions which are formed in such a manner that the stepped portions serve for limiting the travel of the ball along the plate and the ball is set to be slipped when the ball is in contact with one of the stepped portions.

4. A torque variation absorbing device according to claim 1, wherein the ball is positioned so that the relative rotation between the drive plate and the flywheel in the negative direction is set to be smaller than that in the positive direction.

* * * * *